United States Patent
Cromer et al.

[11] Patent Number: 6,105,136
[45] Date of Patent: *Aug. 15, 2000

[54] COMPUTER SYSTEM WHICH IS DISABLED WHEN IT IS DISCONNECTED FROM A NETWORK

[75] Inventors: Daryl C. Cromer, Cary; Brandon J. Ellison, Raleigh; Howard J. Locker; Michael J. Steinmetz, both of Cary; Randall S. Springfield, Chapel Hill; James P. Ward, Raleigh, all of N.C.

[73] Assignee: International Business Machines Corporation, Armonk, N.Y.

[ * ] Notice: This patent is subject to a terminal disclaimer.

[21] Appl. No.: 09/023,606

[22] Filed: Feb. 13, 1998

[51] Int. Cl.⁷ ........................................ G06F 11/30
[52] U.S. Cl. ........................ 713/201; 709/218; 710/104
[58] Field of Search ................... 713/200, 201, 713/202; 714/43, 4; 395/700; 380/25, 4; 340/571; 709/201, 220, 221, 222, 223, 217, 218, 227, 228, 249, 305, 304; 710/10, 100, 104

[56] References Cited

U.S. PATENT DOCUMENTS

| | | | |
|---|---|---|---|
| 5,073,930 | 12/1991 | Green et al. | 380/10 |
| 5,101,373 | 3/1992 | Tanioka et al. | 364/900 |
| 5,253,295 | 10/1993 | Saada et al. | 380/23 |
| 5,287,519 | 2/1994 | Dayan et al. | 395/700 |
| 5,349,643 | 9/1994 | Cox et al. | 380/25 |
| 5,388,156 | 2/1995 | Blackledge, Jr. et al. | 380/4 |
| 5,406,260 | 4/1995 | Cummings et al. | 340/568 |
| 5,533,125 | 7/1996 | Bensimon et al. | 380/4 |
| 5,542,046 | 7/1996 | Carlson et al. | 395/186 |
| 5,555,373 | 9/1996 | Dayan et al. | 713/202 |
| 5,586,251 | 12/1996 | Coleman et al. | 395/183.19 |
| 5,630,058 | 5/1997 | Mosley et al. | 713/201 |
| 5,640,513 | 6/1997 | Dauerer et al. | 395/200.11 |
| 5,689,242 | 11/1997 | Sims et al. | 340/652 |
| 5,712,973 | 1/1998 | Dayan et al. | 713/200 |
| 5,724,260 | 3/1998 | Klein | 364/550 |
| 5,878,210 | 7/1996 | Kong | 713/200 |
| 5,912,621 | 7/1997 | Schmidt | 340/571 |
| 5,925,128 | 7/1997 | Harmon | 713/200 |
| 5,926,091 | 7/1999 | Sevensson et al. | 340/568.2 |
| 5,936,523 | 8/1999 | West | 340/545.6 |
| 5,945,915 | 11/1997 | Cromer et al. | 340/686.1 |
| 5,963,142 | 5/1997 | Zinskey et al. | 340/825.34 |
| 5,991,885 | 11/1999 | Chang et al. | 713/300 |

FOREIGN PATENT DOCUMENTS

2311390  9/1997  United Kingdom ............ G06F 9/445

*Primary Examiner*—Joseph E. Palys
*Assistant Examiner*—RiJue Mai
*Attorney, Agent, or Firm*—Anthony N. Magistrale

[57] ABSTRACT

Described is a computer system which is coupled to a remote computer via a data communication link. The computer system has a normally closed enclosure and is capable of securing data retained within the system against unauthorized access. The computer system includes an erasable memory element mounted within the enclosure for selective activation to active and inactive states and for receiving and storing a security password when in the active state. A manually operable option switch is mounted within the enclosure. The option switch is operatively connected with the erasable memory element and manually settable by a user of the computer system for setting the erasable memory element to the active and inactive states. A communication line detector is operatively connected with the erasable memory element for detecting a disconnection of the data communication link and for clearing any stored security password from the erasable memory element in response to a change of the communication link detector between a first state and a second state.

23 Claims, 5 Drawing Sheets

COMPUTER SYSTEM WHICH IS DISABLED WHEN IT IS DISCONNECTED FROM A NETWORK

RELATED APPLICATIONS

The present invention is believed to be related to the following issued patent and pending applications:

U.S. Pat. No. 5,388,156, "PERSONAL COMPUTER SYSTEM WITH SECURITY FEATURES AND METHOD";

application Ser. No. 08/965,550, filed Nov. 6, 1997, and entitled "SYSTEM AND METHOD FOR DETECTING WHEN A COMPUTER SYSTEM IS REMOVED FROM A NETWORK"; and application Ser. No. 08/965,140, filed Nov. 6, 1997, and entitled "COMPUTER SYSTEM FOR SENDING AN ALERT SIGNAL OVER A NETWORK WHEN A COVER OF SAID SYSTEM HAS BEEN OPENED".

application Ser. No. 08/965,341, filed Nov. 6, 1997, and entitled "COMPUTER SYSTEM AND METHOD TO DISABLE SAME WHEN NETWORK CABLE IS REMOVED".

BACKGROUND OF THE INVENTION

1. Field of the Invention

The present invention relates to computer systems coupled to a network and more particularly, to a computer system which is disabled when it is disconnected from the network.

2. Description of Related Art

Personal computer systems are well known in the art. Personal computer systems have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including random access memory (RAM) and basic input output system read only memory (BIOS ROM), a system monitor, a keyboard, one or more flexible diskette drives, a CD-ROM drive, a fixed disk storage drive (also known as a "hard drive"), a so-called "mouse" pointing device, and an optional printer. One of the distinguishing characteristics of these systems is the use of a motherboard or system planar to electrically connect these components together. Examples of such personal computer systems are IBM's PC 300 series and IBM's Aptiva Series.

Theft of personal computers is becoming a major industry problem. As a result, there has been an ever increasing need to provide security for computer systems against the unauthorized removal or theft thereof. Since modern computer systems are generally more compact and more easily transportable, it is even more difficult to secure against the unauthorized removal or theft thereof.

In addition, today, computer networks are employed to provide efficient computing capabilities throughout a large work area. Existing computer networks generally include a number of remotely located computer systems coupled via a data link to a server system or a central processing center. The wide dissemination of such systems at remote locations has made the systems an even more accessible target for computer thieves.

Accordingly, a number of methods have been developed for guarding against the unauthorized removal of computer systems. For example, U.S. Pat. No. 5,406,260 discloses a method and system for detecting the disconnection of electronic equipment from a network using internal current loops, current sensors and optional alarms. The system includes current loops internally coupled to protected pieces of equipment so that each piece of associated equipment has an associated current loop. A low current power signal is provided to each of the current loops. A sensor monitors the current flow through each current loop to detect removal of the equipment from the network. Removal of a piece of hardware breaks the current flow through the associated current loop which in turn may activate an alarm. However, such systems and methods are very complex and too expensive for today's computer systems.

Although theft of the entire system is a major concern for system owners, an even bigger concern is that the data in the system may be accessed by the thief. Since confidential information, personal information and other valuable data are stored in the computer's hard file, there has been an increasing need to protect the data from unauthorized access even if the entire system is stolen.

Accordingly, a number of methods have been designed to prevent unauthorized access to the data stored in a computer system. For example, U.S. Pat. No. 5,388,156, owned by the assignee of the present invention and incorporated herein by reference, discloses a personal computer system having security features enabling control over access to data retained in such a system. The system has a normally closed enclosure and at least one erasable memory element for receiving and storing a privileged access password (PAP). The PAP is designed to provide protection for the system owner by protecting the initial program load (IPL) device boot list, access to a password utility and access to the System Reference Diskette or System Partition. The system further includes at least one tamper detection switch mounted within the enclosure and operatively connected with the memory element for detecting opening of the enclosure.

If the system of the '156 patent is in one mode, and the enclosure or cover is removed, the tamper detection switch will change states and will set a segment of the memory element to a distinctive value (e.g., all "1"s). This setting of a memory segment to a distinctive state invalidates any previously stored power on password (POP) for purposes of booting an operating system from any source other than the system reference diskette or the system partition. Booting an operating system from either of the last mentioned sources requires entry of a valid PAP. Since the PAP is only known to the system owner, the person tampering with the system will not be able to access any data stored in the hard files therein.

If the system is in another mode, and the enclosure cover is removed by an unauthorized user, the tamper detection switch will change states and invalidate the PAP. If this occurs, no one can access the data in the system including the system owner. In this situation the system board must be replaced.

However, the system of the '156 patent has a disadvantage in that if the entire system is stolen, it can be accessed and used so long as the cover is not removed.

It is therefore desirable to provide a computer system that prevents access to data stored therein when the computer system has been disconnected from the network.

SUMMARY OF THE INVENTION

The present invention is directed to a computer system which is disabled when a network communication link is broken. The computer system is coupled to a remote computer via a data communication link. The computer system has a normally closed enclosure and is capable of securing data retained within the system against unauthorized access. The computer system includes an erasable memory element mounted within the enclosure for selective activation to active and inactive states and for receiving and storing a security password when in the active state. A manually operable option switch is mounted within the enclosure. The option switch is operatively connected with the erasable memory element and manually settable by a user of the computer system for setting the erasable memory element to the active and inactive states.

A communication link detector is operatively connected with the erasable memory element for detecting a disconnection of the data communication link and for clearing any stored security password from the erasable memory element in response to a change of the communication link detector between a first state and a second state. The computer system further includes a central processing unit mounted within the enclosure and operatively connected with the erasable memory element for controlling access to at least certain levels of data stored within the system by distinguishing between the active and inactive states of the memory element and between entry and non-entry of any stored security password.

The computer system can further include a tamper detection switch mounted within the enclosure and operatively connected with the erasable memory element for detecting opening of the enclosure and for clearing any stored security password from the erasable memory element in response to any switching of the tamper switch.

In one embodiment of the present invention, the communication link detector is provided by a communication subsystem (e.g., a network adapter) in circuit communication with the CPU and is operative to generate a link signal (1) in a first state (e.g., active) when the communication link is valid and (2) in a second state (e.g., inactive) when the communication link is broken or disconnected.

Another embodiment of the present invention is directed to a computer system capable of securing data retained within the system against unauthorized access. The computer system is coupled to a remote computer via a data communication link. The system includes a network connector for communicating data with the computer system. The network connector is supplied with auxiliary power and is operative to communicate with the computer system regardless of whether the computer system is in a normal operating state. The network connector is in circuit communication with a CPU and is operative to generate a link signal in a first state as long as a valid communication link is maintained with the remote computer. The network connector is further operative to change the link signal from the first state to a second state when the data communication link is no longer present. When the computer system is powered on after the communication link has been disconnected, the system is unable to boot its operating system until a valid link is reestablished with the remote computer system.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. This application is written for those very familiar with all aspects of computer system design.

Figure 1:
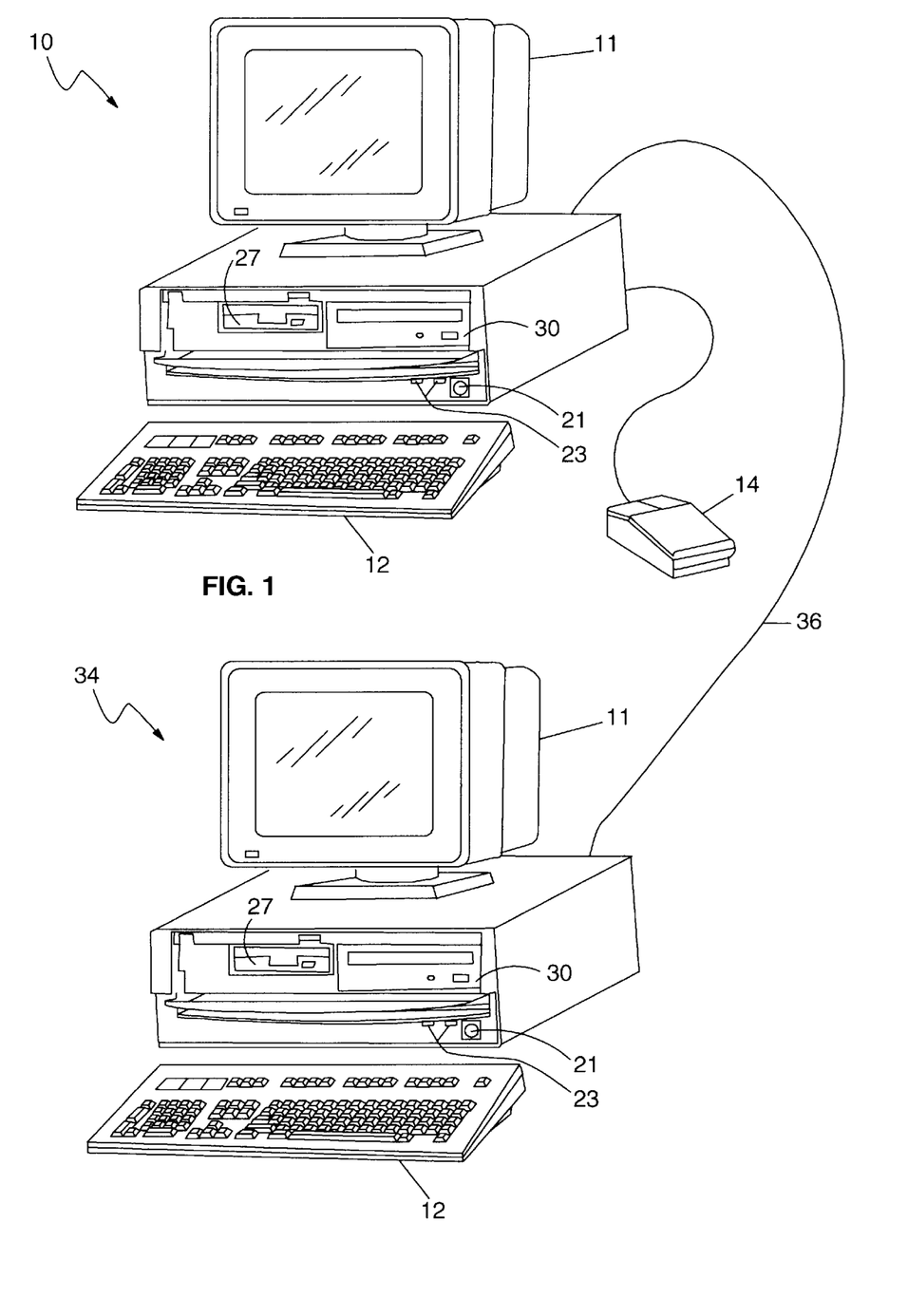
FIG. 1 is a perspective view of a personal computer embodying this invention and a LAN station remote computer system.

Referring now more particularly to the accompanying drawings, a computer system embodying the present invention is there shown and generally indicated at 10 (FIG. 1). As mentioned hereinabove, the computer 10 may have an associated display monitor 11, keyboard 12, mouse 14, and printer or plotter (not shown). The computer 10 has a cover 15 which is a decorative outer member (FIG. 2) and a back plate shield member 18 which cooperate with a chassis 19 in defining an enclosed, shielded volume for receiving electrically powered data processing and storage components for processing and storing digital data. At least certain of these components are mounted on a multi layer planar 20 or motherboard which is mounted on the chassis 19 and provides a means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the operating components of the microcomputer.

Figure 2:
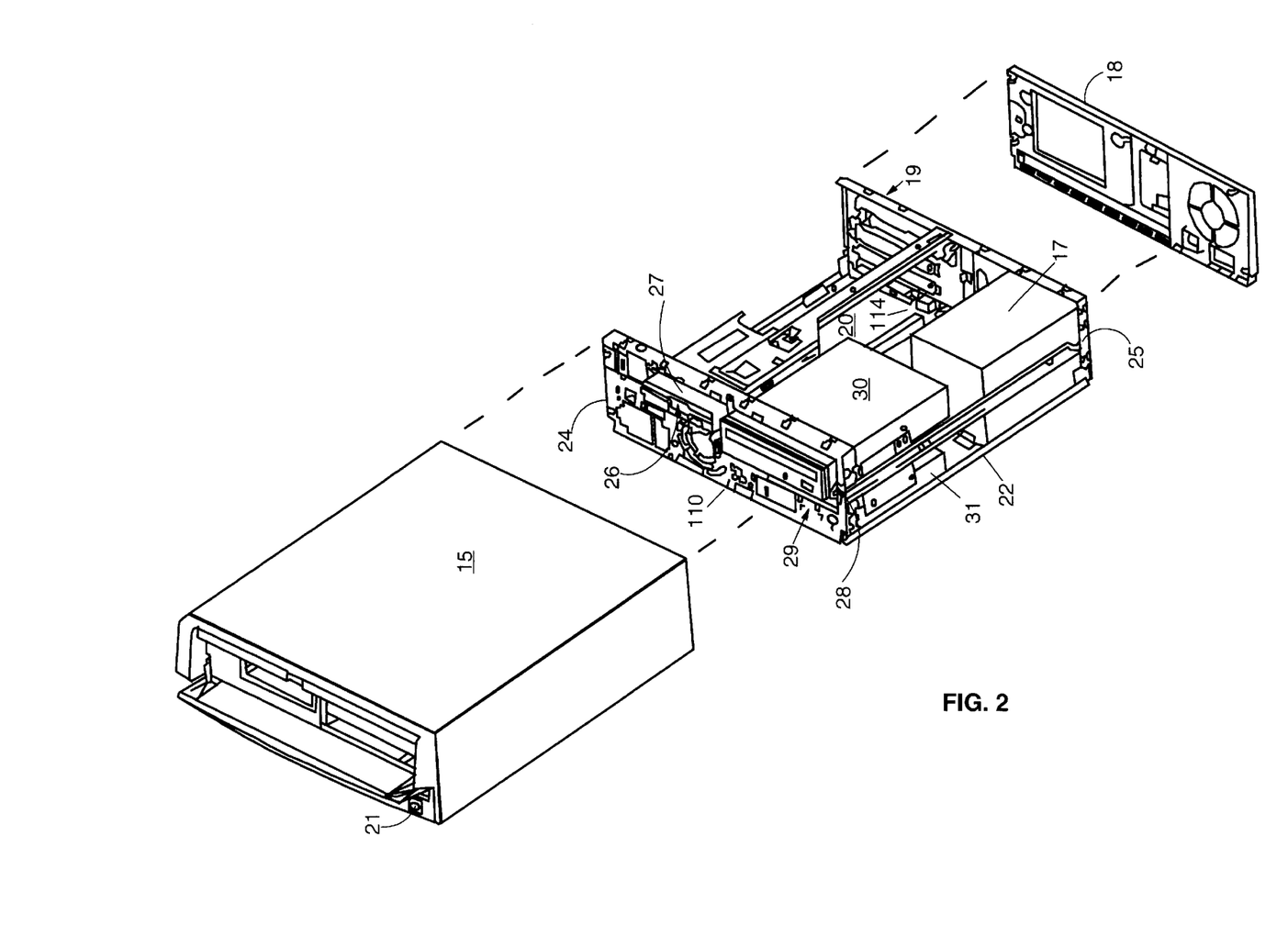
FIG. 2 is an exploded perspective view of certain elements of the personal computer of FIG. 1 including a chassis, a cover, an electromechanical direct access storage device and a planar board and illustrating certain relationships among those elements.

The system 10 has a power supply 17, a power button 21, also herein referred to as switch 21, and LEDs 23 for power indication and hard disk activity. The chassis 19 has a base indicated at 22, a front panel indicated at 24, and a rear panel indicated at 25 (FIG. 2). The front panel 24 defines at least one open bay (and in the form illustrated, three bays) for receiving a data storage device such as a disk drive for magnetic or optical disks, a tape backup drive, or the like. In the illustrated form, a pair of upper bays 26, 28 and a lower bay 29 are provided. One of the upper bays 26 is adapted to receive peripheral drives of a first size (such as those known as 3.5 inch drives) while the other 28 is adapted to receive drives of a different size (such as a CD ROM drive) and the lower bay is adapted to receive another drive. One floppy disk drive is indicated at 27 in FIGS. 1 and 2, and is a removable medium direct access storage device (DASD)

capable of receiving a diskette inserted there into and using the diskette to receive, store and deliver data as is generally known. One CD ROM drive is indicated at 30 in FIGS. 1 and 2 and is a removable medium direct access storage device capable of receiving a compact disc inserted there into and using the disc to deliver data as is generally known. One hard disk drive is indicated at 31 in FIG. 2 and is a fixed medium direct access storage device capable of storing and delivering data as is generally known.

Figure 3:
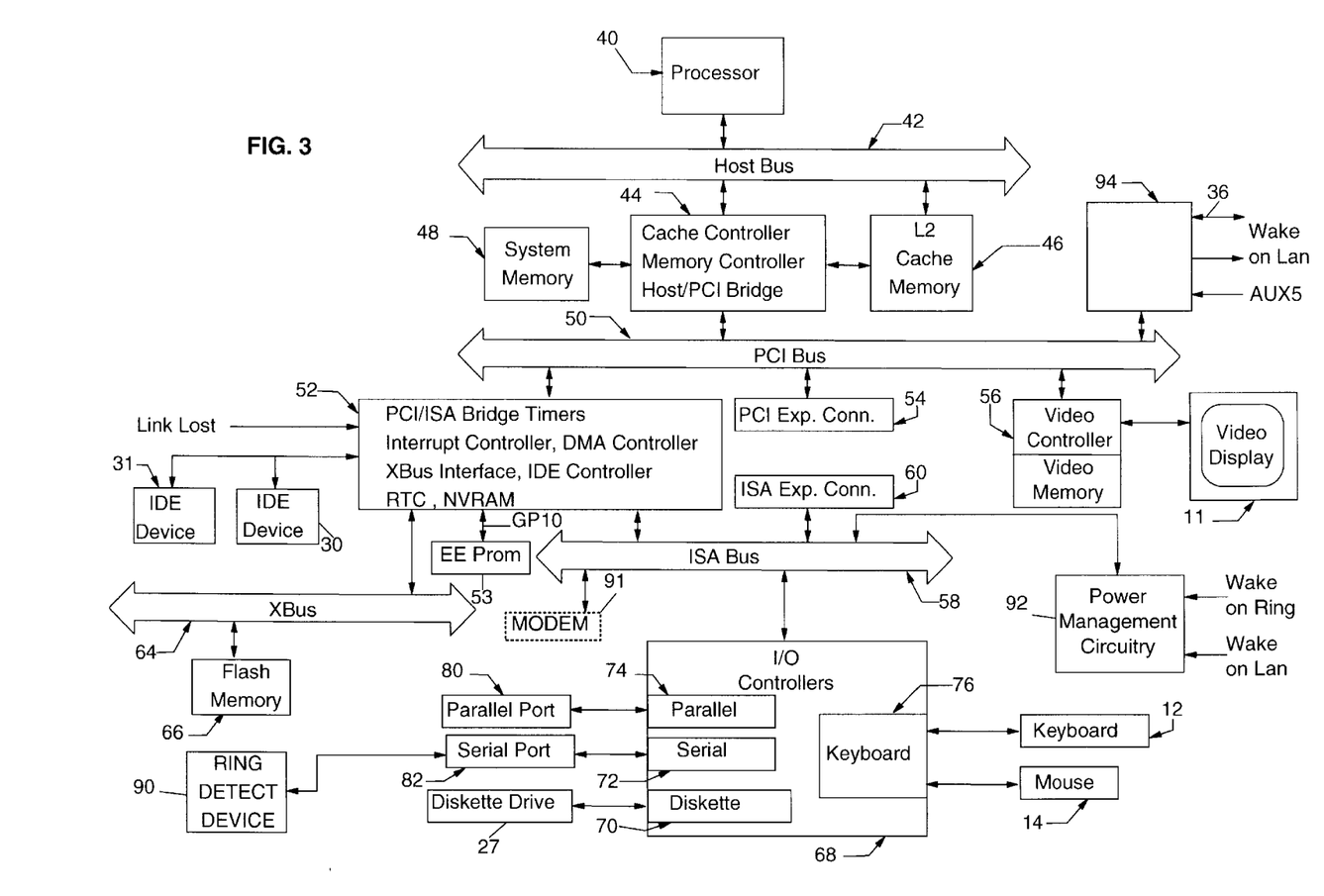
FIG. 3 shows a block diagram of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar 20 to the IO expansion connectors and other hardware of the personal computer system. Connected to the planar 20 is the system CPU or processor 40 which is connected directly to a high speed CPU host bus 42. A first system core logic chipset 44 and L2 cache memory 46 are also connected to the host bus 42. The first core logic chipset 44 includes a memory control unit, a L2 cache controller and a peripheral component interconnect (PCI) bridge. The memory control unit is further connected to a volatile random access memory (RAM) 48. The RAM memory 48 is composed of one or more memory modules. The memory controller includes the logic for mapping addresses to and from the microprocessor 40 to particular areas of RAM 48. The cache controller is operatively coupled to the L2 cache memory 46.

The first core chipset 44 can be, for example, a Triton VX chip which is sold by Intel Corporation. The PCI bridge within chipset 44 provides an interface between the local bus 42 and a PCI bus 50. Connected to the PCI bus 50 is a second core chipset 52 and a plurality of PCI expansion connectors 54 for receiving PCI bus compatible peripheral cards. One such peripheral card is a video controller 56. The video controller 56 includes video memory and is coupled to the monitor or video display terminal 11. The chipset 52 can be, for example, an PIIX3 chip which is also sold by Intel Corporation.

The chipset 52 contains a bus control and timing unit, a plurality of timers, an interrupt controller, a direct access memory (DMA) unit, nonvolatile CMOS RAM, also herein referred to as NVRAM, a CMOS real-time clock (RTC), an XBus controller, a PCI/ISA bridge and an integrated drive electronics (IDE) controller. The PCI/ISA bridge provides an interface between the PCI bus 50 and an optional feature or expansion bus such as the Industry Standard Architecture (ISA) bus 58. Connected to the ISA bus 58 are a plurality of ISA expansion connectors 60 for receiving ISA adapter cards (not shown). ISA adapter cards can be pluggably connected to the ISA expansion connectors 60 and may provide additional IO devices or memory for the system 10.

The IDE controller provides for the attachment of IDE compatible storage devices such as the fixed disk drive 31 and CD-ROM drive 30.

The real-time clock is used for time of day calculations and the NVRAM is used to store system configuration data. That is, the NVRAM will contain values which describe the present configuration of the system 10. For example, NVRAM 52 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to NVRAM.

Coupled to the ISA bus 58 is a multi-function IO controller 68 such as, for example, a National Semiconductor PC87306. The IO controller 68 contains a variety of IO adapters and other components such as the diskette adapter 70, serial adapter 72, a parallel adapter 74 and keyboard controller 76. The diskette adapter 70 provides the interface to the diskette drive 27. The serial adapter 72 has an external port connector 82 for attachment of external devices such as ring detect device 90. The parallel adapter 74 has an external port connector 80 for attachment of external devices such as printers (not shown). The keyboard controller 76 is the interface for the keyboard 12 and the mouse 14.

Power management circuitry 92 is also coupled to the ISA bus 58 for changing the system 10 between various power states (e.g., off, standby, sleep, suspend and normal operating states). The present invention will operate in any of these power states. Accordingly, the description which follows will be independent of power state.

The circuitry 92 is supplied with auxiliary power from the power supply 17 when the system 10 is in the off state so that it can monitor events which cause the system 10 to turn on. For example, when the system is in the off state and a telephone ring is detected by ring detect device 90, a wake on ring signal is sent from the device 90 through serial port 82 to the power management circuitry 92. In response to receiving this signal the circuitry 92 will cause system 10 to change to the normal operating state. The ring detect device 90 can be, for example, an external modem or any other device which can detect a telephone ring and generate the wake on ring signal to the circuitry 92. Such other devices can include motion sensors, voice activated sensors, light sensors, etc. In addition, an internal modem 91 could be connected directly to the ISA bus 58 or PCI bus 50. The modem 91 is wired to a modem pin on the planar 20 and is operative to generate the ring signal when it detects a telephone ring.

The circuitry 92 also includes a timer which is configurable by a user to expire after a predetermined period of time. When the timer expires, the circuitry 92 will cause the system 10 to change from the off state to the normal operating state.

A LAN adapter or subsystem 94 can be coupled to either the PCI bus 50 or the ISA bus 58 for allowing system 10 to communicate with a remote computer 34 or server over a LAN via a connection or link 36. The LAN adapter is supplied with auxiliary power (AUX5) from the power supply 17 when the system 10 is off. When the LAN adapter 94 is set in a wake up mode it scans all incoming frames from the LAN addressed to system 10 for a specific data frame. If the LAN adapter scans a frame and does not find the specific data frame, it discards the frame and takes no further action. If the LAN adapter 94 detects the specific data frame, however, it alerts the power management circuitry 92 via a wake on LAN signal to power on the system 10 (i.e., change from the off state to the normal operating state). The LAN adapter can be, for example, an IBM Auto Wake Token-Ring ISA Adapter.

A planar XBus 64 is coupled to the PCI bus 50 and ISA bus 58 via chipset 52. The planar XBus 64 includes address, data, and control components respectively. The planar XBus 64 is an additional IO bus in system 10 and is used as a local bus to support slow speed peripheral devices that reside on the planar board. Attached to the XBus 64 is a flash memory (FM) module or chip 66.

The flash memory 66 is an electrically erasable programmable read only memory (EEPROM) module or chip and includes the BIOS that is used to interface between the IO devices and the operating system. BIOS stored in memory 66 can be copied into RAM 48 to decrease the execution time of BIOS. FM 66 is further responsive to the XBus controller (via ROMSEL signal) within chipset 52. If System RAM 48 is disabled for the BIOS address range then access requests to that address range are passed through the host bridge 44 and the PCI/ISA bridge to memory 66. If System RAM 48 is enabled for the BIOS address range then access requests to that address range are directed to system RAM 48.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 40 could be an Intel Pentium processor, Cyrix 586-P75 processor or Advanced Micro Devices 8486 processor or any other suitable microprocessor.

The microcomputer system 10 is shown with 16 megabytes of system memory 48. It is understood that additional memory can be interconnected as represented in FIG. 3 by installing additional or higher-density memory modules. For purposes of illustration only, the present invention is described with reference to the 16 megabyte memory configuration.

Referring back to FIG. 1, there is shown the local computer system 10 along with a perspective view of a remote personal computer 34. While not here shown or described in detail, the remote computer system 34 has components and attributes like those illustrated and described with regard to FIG. 3 and those additional elements appropriate to provide the non-volatile storage mentioned, as is known to the person skilled in the appropriate arts. The remote computer system or remote management system 34 can be, for example, a client, a personal computer or a server. A storage means associated with the remote computer 34 can be a non-volatile means such as a direct access storage device (DASD) in the form of a hard disk device, diskette, compact disc or the like.

The local and remote computers 10, 34 are associated one with the other through some form of local area network (LAN) or the like, in which effective communication may be established through electrically conductive connections, through fiber optical links, through infrared or other radiation links, or in other manners. Such a link is indicated in FIG. 1 at 36. The network may be a token-ring network or an Ethernet network, or other known type of network. Each of the computers may be a "personal computer" as defined herein. Alternatively, the remote computer 34 may be some computer having capabilities other than those ascribed herein to a "personal computer", and possibly beyond those capabilities.

While the term "remote" is used with reference to the computer system 34 through which the LAN station local computer system 10 accesses BIOS, that term is used in the sense of indicating separation, rather than in the sense of indicating a large physical distance between the systems. In fact, such system may be physically adjacent in some network arrangements.

Figure 4:
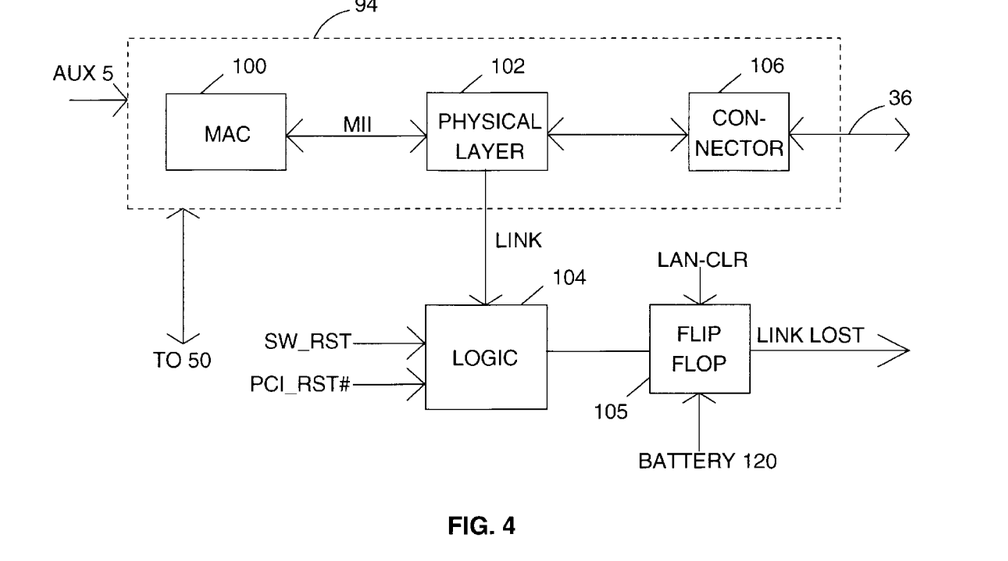
FIG. 4 is a schematic diagram of certain components of the personal computer of FIGS. 1 and 2 in accordance with the present invention.

One embodiment of the present invention will now be described while referring to FIGS. 3 and 4. The LAN adapter 94 includes a Media Access Controller (MAC) 100. The MAC 100 serves as an interface between a shared data path (e.g., media independent interface (described below) and the PCI bus 50 (or ISA bus 58 if adapter 94 were connected to the ISA bus 58). The MAC 100 performs a number of functions involved in the transmission and reception of data packets. For example, during the transmission of data, the MAC assembles the data to be transmitted into a packet with address and error detection fields. Conversely, during the reception of a packet, the MAC 100 disassembles the packet and performs address checking and error detection. In addition, the MAC 100 typically performs encoding/decoding of digital signals transmitted over the shared path and performs preamble generation/removal as well as bit transmission/reception. The MAC 100 can be for example, an Intel 82557 chip.

The LAN adapter 94 further includes a media independent interface (MII) which is a local bus between the MAC 100 and a physical layer 102. The physical layer 102 implements a fully compliant IEEE 802.3u MII interface for connection to MACs or repeaters allowing connection between the physical layer 102 and MAC 100 on the same board, motherboard/daughterboard or via a cable in a similar manner to AUI connections. The MII is a specification of signals and protocols which formalizes the interfacing of a 10/100 Mbps Ethernet Media Access Controller to the underlying physical layer 102.

The physical layer 102 can be a fully integrated device supporting 10 and 100 Mb/s CSMA/CD Ethernet applications. The physical layer 102 receives parallel data from the MII local bus and converts it to serial data for transmission over cable 36. The physical layer 102 is also responsible for wave shaping and provides analog voltages to cable 36. The physical layer 102 can be for example, an Integrated Services Systems 1890 chip.

The physical layer 102 includes auto-negotiation logic which has three main purposes. First, to determine the capabilities of the remote computer 34. Second, to advertise its own capabilities to the remote computer 34. And third, to establish a connection with the remote computer 34 using the highest performance common connection technology.

The physical layer 102 also provides a LINK status signal which reflects the current link status. The output of the LINK signal is low when a valid link exists between system 10 and remote computer 34 (e.g., Ethernet hub or bridge is established). Since auxiliary voltage (AUX5) is provided to the Ethernet subsystem (MAC 100 and physical layer 102) to support Wake On LAN (WOL), the link remains in tack when the system 10 is powered off. As long as the physical connection between the system 10 and the host network is in place, the LINK signal will remain low. If the link is broken due to, for example, cable 36 being removed, cable 36 being cut, cable removal at the Hub or system 10 is stolen then the link is broken and the LINK signal will go high. Logic block 104 monitors the LINK indication signal output from the physical layer 102 and outputs a LINK LOST signal. The LINK signal is qualified by logic 104 to screen "false" tamper events (described below). A change in the LINK LOST signal from low to high is held in a battery backup latch 105. This event is referred to as a LANLeash tamper and is held in the battery backup latch 105. Since the Ethernet subsystem 94 is powered off AUX 5, the mechanism will work in all power states.

On each power cycle, BIOS checks the latch 105 for a LANLeash tamper event. If such a tamper has occurred, BIOS will display a message indicating that the system 10 is unable to boot until it is connected to the network. If the system 10 was stolen, it is thus rendered useless. On the other hand, if the system 10 was just disconnected or relocated, BIOS will send a "request approval to boot" via adapter 94 to the system administrator via network link 36. The request contains information which indicates a LAN-Leash tamper has occurred, a machine identification (i.e., a universal unique identification (UUID)) and a request to boot. When the network administrator receives the "request approval to boot" he can, based on the UUID, identify the machine and determine if the system 10 was part of a planned disconnect or a move. This allows network administers to send an "approval to boot" packet to system 10 if it was only disconnected or send security if the system 10 was impermissibly disconnected.

BIOS will not start the boot sequence until the network administrator sends an "approval to boot" in a packet via cable 36 and network adapter 94. After the network administrator sends the approval to boot, BIOS clears the LAN-Leash tamper via LAN_CLR which is a GPIO bit from chipset 52.

As noted above, an erroneous or false LANLeash tamper can be caused by software or hardware resetting the physical layer 102 resulting in a lost link indication (LINK signal goes high). This can occur, for example, during power on or when an Ethernet device driver loads. The present invention handles such false tampers by having advanced knowledge of a loss of link due to such a software or hardware reset and blocking the loss of link via logic 104. More specifically, for a software reset, a GPIO bit from chipset 52 (SW_RST) is set to a logic "1" by the ethernet device driver and this will block the loss of link from being passed through logic 104 (i.e., LINK LOST remains low). For a hardware reset, the PCI_RST# pin from chipset 52 is held at a logic "0" for at least two clock cycles and may be held low as long as desired. PCI_RST# is detected by logic 104 and blocks the loss of link from being passed through logic 104. After a software or hardware reset, the physical layer 102 will initialize, renegotiate and establish the link between system 10 and remote computer 34. After the link is established the LINK signal is low and the LINK LOST signal is no longer blocked by logic 104 which can then detect an accurate LANLeash tamper.

The LAN adapter 94 further includes an RJ45 connector 106 which is the physical interface between the adapter 94 and cable 36.

Alternative to the LAN adapter 94, a LAN connector or connection could be imbedded or integrated on the planar 20 and would include all the same connections and components as the adapter 94. Such a connector will be referred to as LAN subsystem 94. The present invention is also suitable for a single chip Ethernet, token ring and ATM.

Referring to FIG. 3, the system 10 has an erasable memory element mounted within the system enclosure for selective activation to active and inactive states and for receiving and storing a privileged access password (PAP) when in the active state. The erasable memory element preferably is an EEPROM 53 coupled to chipset 52 via several GPIO pins. The system 10 also has an option or security switch mounted within the enclosure and operatively connected with the memory element 53 for setting that memory element to the active and inactive states. The option switch may be, for example, a jumper mounted on the system planar 20 and manually settable to two different states by a person having access to the planar. In one state (also known as the write enable state), the memory element 53 is set to be active and to store a PAP. In the write enable state, the PAP may be written to the memory element 53, changed or removed. In the other or inactive state, the PAP storage capability of the memory element 53 is set to be inactive.

As mentioned above, the system 10 also has a second component having erasable memory capabilities, namely a non-volatile RAM and an associated RTC indicated at 52 in FIG. 3. The NVRAM stores data indicative of the system configuration including, in accordance with the present invention, data regarding the successful entry of the PAP on power up of the system 10.

At least one tamper detection switch 110 (FIG. 5) is provided, mounted within the enclosure and operatively connected with the NVRAM 52 for detecting opening of the enclosure and for clearing certain data stored in NVRAM 52 in response to any switching of the tamper detection switch 110. A key lock switch (not shown) is also mounted within the enclosure and is normally held closed on locking of the enclosure lock which is conventionally supplied on the system 10.

Figure 5:
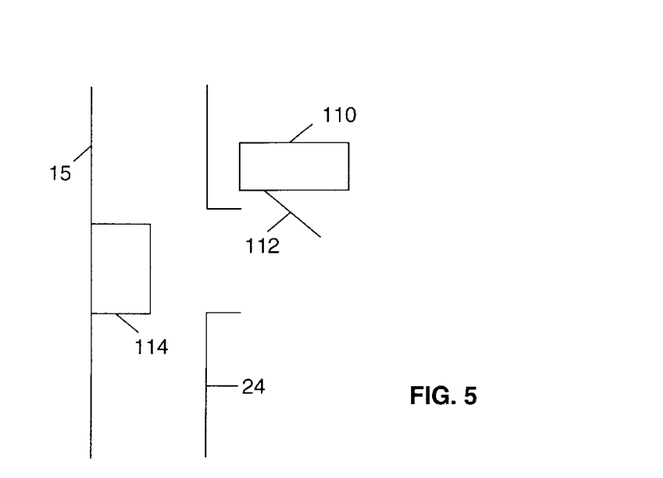
FIG. 5 is an enlarged view of the cover tamper switch of the personal computer of FIGS. 1 and 2.

The tamper detection switch 110 is preferably mounted on the front panel 24 so as to be appropriately positioned relative to the main enclosure cover 15. The tamper switch 110 is mounted in the computer system frame in such a position that an actuating lever 112 for the tamper switch 110 protrudes through an opening in the front panel 24 to be actuated by a stub 114 on the cover 15. When the cover 15 is positioned to enclose the system chassis 19, the stub 114 pushes lever 112 such that the switch 110 is closed. When the cover 15 is removed or opened, the lever 112 returns switch 110 to an open position.

Figure 6:
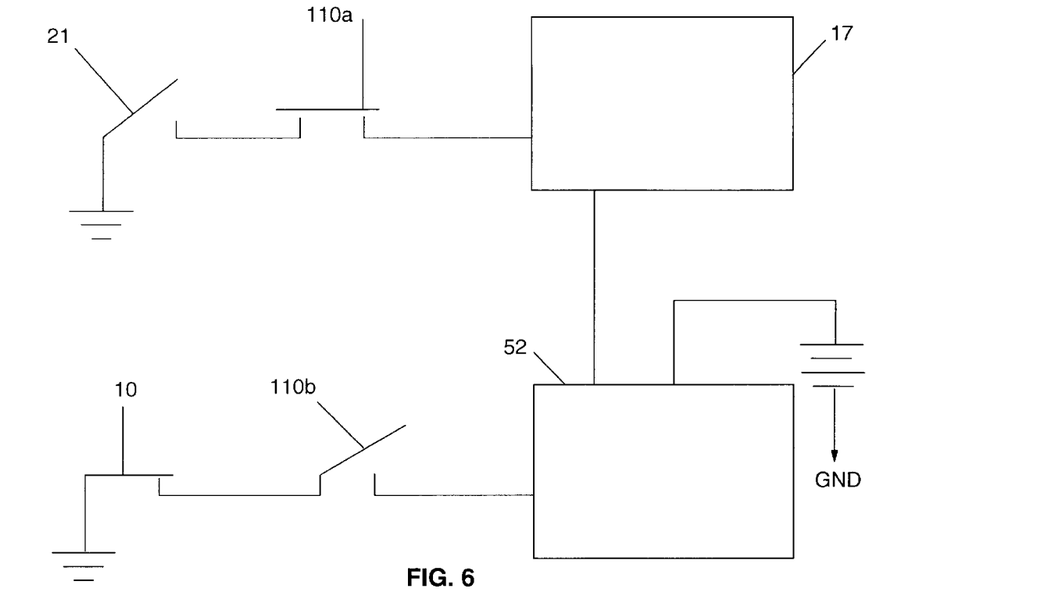
FIG. 6 is a schematic representation of certain components of the personal computer of FIGS. 1 and 2.

FIG. 6 illustrates certain relationships among power switch 21, power supply 17, tamper switch 110 which changes conductive state in response to opening or removal of the main cover 15, and the keylock switch. The tamper switch 110 has two components, one normally open (110a) and one normally closed (110b). The normally open contact set of the cover switch 110 is connected in series with the power switch 21 and to the power supply 17. As a consequence, if an attempt is made to "power up" the system 10 with the main cover 15 removed, the contact set 110a will be open and prevent system operation. With the cover 15 in place, the contact set 110a is held closed and normal system operation may be initiated.

The normally closed contact set 110b of the tamper switch 110 is connected in series with the keylock switch 116 and to the RTC and NVRAM. The normally closed contact set 110b are held open by the presence of the cover 15 and will close on the removal of the cover 15. As noted above, the keylock switch 116 is normally held closed on locking of the enclosure lock which is conventionally supplied on the system 10. These contact sets provide an alternate path to ground for current otherwise energizing portions of the RTC and NVRAM, and have the effect of setting a segment of that memory to a distinctive state (such as all "1"s) if energization is lost, as upon unauthorized removal of the cover 15 while the system is in an enclosure locked state. As that memory is checked by POST, setting that segment to a distinctive state will result in a configuration error signal being generated which will alert a system owner that an attempt (successful or otherwise) has been made to breach system security. This setting of a memory segment to a distinctive state invalidates any previously stored power on password (POP) for purposes of booting an operating system from any source other than the system reference diskette or the system partition. Booting an operating system from either of the last mentioned sources requires entry of a valid PAP as otherwise disclosed in U.S. Pat. No. 5,388,156.

Password security is implemented by system hardware features; an EEPROM, the security switch and the tamper evident cover switch 110, network adapter 94, firmware, POST and the system software password utility. Once the PAP has been installed, the system is in secure mode. The PAP is saved in the EEPROM 53. A backup copy of the PAP is also maintained in the EEPROM 53. This is done to prevent accidental loss of the PAP when a power failure occurs during the installation, change or removal of the PAP. The POP and at least certain bits indicative of the validity of the PAP (if installed) are stored in NVRAM 52. Changes in data retained in the NVRAM and in the EEPROM 53 are independent one from the other.

As mentioned above, the POP is maintained in NVRAM 52. Two bits will be maintained in NVRAM for use as password indicators for the PAP. One indicator is used to signify that the system is in secure mode (PAP installed). The second indicator is to signify that the PAP was entered during the initial power on, cold boot. These two indicators will be initialized and set at a cold boot only. Prior to initial program load (IPL), the indicators will be write protected unless the system reference diskette or system partition is booted, which requires the successful entry of any installed PAP. Changes in the POP and in the indicators are independent of any changes in the PAP stored in the EEPROM 53. However, changes in the NVRAM can indicate security violations which require entry of a valid PAP for recovery permitting the loading of an operating system.

To prevent any unauthorized access to the passwords, the IPL device boot list and all the indicators will be locked prior to IPL booting an operating system. To lockout these areas, POST will set special hardware latches that cannot be reset unless the system is powered off. At the beginning of POST Stage I (initial power on), POST will check to see if the EEPROM is locked. If it is locked, POST will display an error and halt the system because the hardware is not functional. The system owner will need to intervene to remedy the situation, which might require that the system board be replaced. In one exemplary form, when the system has been tampered with, the first 14 bytes of RAM storage in NVRAM associated with the RTC and control registers are unaffected. The next 50 bytes of NVRAM are set to all "1's" as briefly described above. Upon detecting this condition POST displays an appropriate error. In another form, as little as a single bit may be set to a state indicative of tampering. In either instance, the system owner/authorized user will need to intervene to remedy the situation which might require entry of the PAP at the password prompt to boot from the system reference diskette or the system partition or that the system board be re-configured.

If the system owner forgets the PAP, the system board(s) affected will need to be replaced. If the POP is forgotten, the system owner can toggle the tamper evident cover switch 110 to destroy the contents of NVRAM as described above, and then enter the PAP (if installed) to boot the System Reference Diskette or the System Partition to run the password utility, to reinstall the POP.

The present invention improves upon the tamper alert disclosed in U.S. Pat. No. 5,388,156 by adding another condition which will activate the tamper alert and clear certain data stored in NVRAM 52. Namely, a break or disconnect in the link between system 10 and remote computer 34 will also activate a tamper alert.

Figure 7:
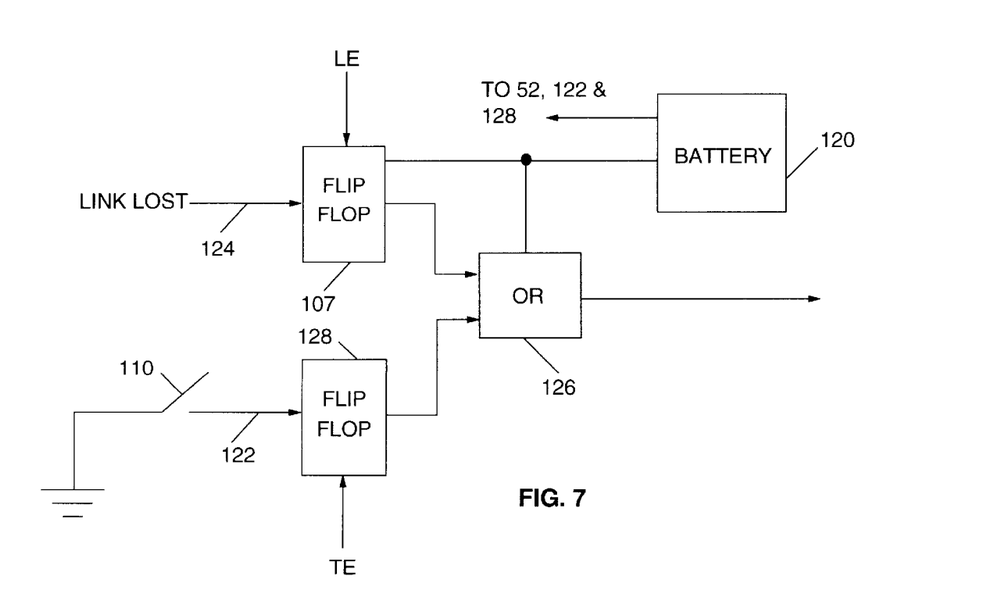
FIG. 7 is a schematic diagram of certain components of the personal computer of FIGS. 1 and 2 in accordance with the present invention.

Turning now to FIG. 7, there is shown a schematic diagram of certain components of the system 10 in accordance with another embodiment of the present invention. A system battery 120 supplies power to a tamper detection switch line 122, an OR gate 126 and flip flops 128 and 107. The battery 120 is a 3 V battery that supplies power regardless of whether the system 10 is powered on or not (i.e., regardless of whether the power supply 17 is supplying system power or not).

As noted above, the tamper detection switch 110 changes state on opening or removal of the cover 15 such that if the cover is on, the switch 110 is closed and cover tamper switch line 122 will be a logical "0" (connected to ground). If the cover is removed the switch 110 is open and the line 122 will go to a logical "1" (battery powered). Similarly, as noted above, the LINK status signal changes state on removal, loss of, or break in, etc. the network connection between system 10 and remoter computer 34 such that if there is a valid link between system 10 and remote system 34, the LINK LOST signal is low and if and when the link is broken, the LINK LOST signal is high.

The tamper switch line 122 and the LINK LOST signal line 124 are coupled to flip flops 128 and 107 respectively, the outputs of which are in turn coupled to OR gate 126 such that if either or both of the lines 122 and 124 are high (logic "1") then the output of the OR Gate 126 will also be high. A general purpose output line (LANLeash enable (LE)) from chipset 52 is connected to flip flop 107. The general purpose output line is settable by a user to either enable the LANLeash tamper (LE line active) or disable the LANLeash tamper (LE line inactive). Similarly, a general purpose output line (tamper enable (TE)) from chipset 52 is connected to flip flop 128. The general purpose output line is settable by a user to either enable (TE line active) or disable (TE line inactive) the cover tamper alert.

In operation, if the cover and LANLeash tamper alerts are enabled via the TE and LE lines then, if either the cover 15 is opened (tamper switch line 122 is high) or the network link is broken (LINK LOST line 124 is high) the output of the OR gate 126 will be activated (high) such that the tamper alert line will be active. This condition will disable the system 10 such that no one can access the data stored therein as described above (PAP or POP invalidated). Of course, if the LANLeash tamper alert is disabled via LE line then regardless of whether the link is broken or not, the output of flip flop 107 will always be disabled (low). Similarly, if the cover tamper alert is disabled via the TE line, then regardless of whether the cover is opened or not, the output of flip flop 128 will always be disabled.

The present invention provides the advantage that if there is a break in the network connection between computer system 10 and remote computer 34, computer system 10 is disabled. Therefore, it is not possible to steal and reuse the system 10 or copy the data stored therein. This can assist a system owner in preventing unauthorized access to important data stored in the system even if the entire system is stolen. In addition, computer system 10 is not required to be powered on for the present invention to operate.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A computer system for receiving and retaining data and capable of securing data retained within the system against unauthorized access, said system being coupled to a remote computer via a data communication link, said system comprising:

a normally closed enclosure, an erasable memory element mounted within said enclosure for selective activation to active and inactive states and for receiving and storing a security password when in the active state, a manually operable option switch mounted within said enclosure, said option switch being operatively connected with said erasable memory element and manually settable by a user of the computer system for setting said erasable memory element to the active and inactive states, communication link detector operatively connected with said erasable memory element for detecting a disconnection of said data communication link and for clearing any stored security password from said erasable memory element in response to a change of said communication link detector between a first state and a second state, and a central processing unit mounted within said enclosure and operatively connected with said erasable memory element for controlling access to at least certain levels of data stored within the system by distinguishing between the active and inactive states of said memory element and between entry and non-entry of any stored security password.

2. The computer system of claim 1, wherein said detector is a network connector in circuit communication with said CPU, said network connector being operative to generate a link signal in a first state as long as a valid communication link is maintained with said remote computer and wherein said detector is operative to change said link signal from said first state to a second state when said data communication link is disconnected and further wherein said link signal status is detected by said computer system.

3. The computer system of claim 2, wherein on a power on after said communication line has been disconnected, said system is unable to boot its operating system until a valid link is reestablished with said remote computer system.

4. The computer system of claim 2, wherein after said system is reconnected to said remote computer system with a valid link, said network connector sends an information packet over said communication link to said remote computer, said information packet containing information which allows a system administrator to specifically identify whether said computer system was disconnected inadvertently or a system level break-in has occurred.

5. The computer system of claim 4, wherein if said system was inadvertently disconnected from said remote computer, said remote computer sends an approval to boot packet to said computer system which in response thereto clears said LANLeash tamper signal and continues a boot process to boot the operating system.

6. The computer system of claim 1, wherein said detector is a network connector in circuit communication with said CPU, said network connector being operative to generate a link signal which changes from a first state to a second state when said data communication link is disconnected.

7. The computer system of claim 1, further including a tamper detection switch mounted within said enclosure and operatively connected with said erasable memory element for detecting opening of said enclosure and for clearing any stored security password from said erasable memory element in response to any switching of said tamper switch.

8. The computer system of claim 1, wherein said security password is a privileged access password.

9. The computer system of claim 5, wherein said security password is a privileged access password.

10. The computer system of claim 1, further including a logic circuit coupled to said communication link detector and said logic circuit is settable by a user between an enabled state and a disabled state, wherein when said logic circuit is in the enabled state, said changing of said link signal from said first state to said second state clears said security password and activates a LANLeash tamper signal and wherein when said logic circuit is in said disabled state said changing of said states of said link signal does not clear said security password and said LANLeash tamper signal is not activated.

11. The computer system of claim 8, wherein said computer system is operative to monitor said LANLeash tamper signal such that on a power on cycle, said system checks the status of said LANLeash tamper signal and (1) if said tamper signal is active, said system is unable to boot its operating system until a valid link is reestablished with said remote computer system, or (2) if said tamper signal is not active, said system is able to boot its operating system.

12. A computer system for receiving and retaining data and capable of securing data retained within the system against unauthorized access, said system being coupled to a remote computer via a data communication link, said system comprising:

a normally closed enclosure, a first erasable memory element mounted within said enclosure for selective activation to active and inactive states and for receiving and storing a privileged access password when in the active state, a manually operable option switch mounted within said enclosure and operatively connected with said first erasable memory element for setting said first erasable memory element to the active and inactive states, a second erasable memory element mounted within said enclosure for receiving and storing data indicative of the state of said first erasable memory element and of correct entry of any stored privileged access password, communication link detector operatively connected with said second erasable memory element for detecting unauthorized disconnection from said data communication link and for invalidating any privileged access password stored in said first erasable memory element in response to any change of said communication link detector between a first state and a second state, a tamper detection switch mounted within said enclosure and operatively connected with said second erasable memory element for detecting unauthorized opening of said enclosure and for invalidating any privileged access password stored in said first erasable memory element in response to any switching of said tamper switch, and a central processing unit mounted within said enclosure and operatively connected with said erasable memory elements for controlling access to at least certain levels of data stored within the system by distinguishing between the active and inactive states of said first memory element and between entry and non-entry of any valid stored privileged access password.

13. The computer system of claim 12, wherein said detector is a network connector in circuit communication with said CPU, said network connector being operative to generate a link signal in a first state as long as a valid communication link is maintained with said remote computer and wherein said detector is operative to change said link signal from said first state to a second state when said data communication link is disconnected.

14. The computer system of claim 13, wherein on a power on after said communication line has been disconnected, said system is unable to boot its operating system until a valid link is reestablished with said remote computer system.

15. The computer system of clam 13, further including a logic circuit coupled to said communication link detector and said logic circuit is settable by a user between an enabled state and a disabled state, wherein when said logic circuit is in the enabled state, said changing of said link signal from said first state to said second state clears said security password and activates a LANLeash tamper signal and wherein when said logic circuit is in said disabled state said changing of said states of said link signal does not clear said security password and said LANLeash tamper signal is not activated.

16. The computer system of claim 15, wherein said computer system is operative to monitor said LANLeash tamper signal such that on a power on cycle, said system checks the status of said LANLeash tamper signal and (1) if said tamper signal is active, said system is unable to boot its operating system until a valid link is reestablished with said remote computer system, or (2) if said tamper signal is not active, said system is able to boot its operating system.

17. A computer system for receiving and retaining data and capable of securing data retained within the system against unauthorized access, said system being coupled to a remote computer via a data communication link, said system comprising:

a network connector for communicating data with said computer system, said network connector being supplied with auxiliary power and being operative to communicate with said computer system regardless of whether said computer system is in a normal operating state, said network connector being in circuit communication with a CPU, said network connector being operative to generate a link signal in a first state as long as a valid communication link is maintained with said remote computer and wherein said connector is operative to change said link signal from said first state to a second state when said data communication link is disconnected, and wherein on a power on after said communication link has been disconnected, said system is unable to boot its operating system until a valid link is reestablished with said remote computer system.

18. The computer system of claim 17, wherein if said communication link is valid said link signal is active and if said communication link is not valid said link signal is inactive and further wherein said link signal status is detected by said computer system.

19. The computer system of claim 17, wherein said computer system further includes a normally closed enclosure and an erasable memory element mounted within said enclosure for selective activation to active and inactive states for receiving and storing a security password when in the active state.

20. The computer system of clam 19, further including a logic circuit coupled to said network connector, said logic circuit being settable by a user between an enabled state and a disabled state, wherein when said logic circuit is in the enabled state, said changing of said link signal from said first state to said second state clears said security password and activates a LANLeash tamper signal and wherein when said logic circuit is in said disabled state said changing of said states of said link signal does not clear said security password and said LANLeash tamper signal is not activated.

21. The computer system of claim 20, wherein said computer system is operative to monitor said LANLeash tamper signal such that on a power on cycle, said system checks the status of said LANLeash tamper signal and (1) if said tamper signal is active, said system is unable to boot its operating system until a valid link is reestablished with said remote computer system, or (2) if said tamper signal is not active, said system is able to boot its operating system.

22. The computer system of claim 17, wherein after said system is reconnected to said remote computer system with a valid link, said network connector sends an information packet over said communication link to said remote computer, said information packet containing information which allows a system administrator to specifically identify whether said computer system was disconnected inadvertently or a system level break-in has occurred.

23. The computer system of claim 22, wherein if said system was inadvertently disconnected from said remote computer, said remote computer sends an approval to boot packet to said computer system which in response thereto clears said LANLeash tamper signal and continues a boot process to boot the operating system.

* * * * *